(No Model.)

E. W. COOKE.
WAGON AXLE AND HUB.

No. 442,353.                     Patented Dec. 9, 1890.

Witnesses:

Inventor:

ATTORNEY.

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

WAGON AXLE AND HUB.

SPECIFICATION forming part of Letters Patent No. 442,353, dated December 9, 1890.

Application filed January 2, 1890. Serial No. 335,703. (No model.)

*To all whom it may concern:*

Be it known that I, ERNEST WILLIAM COOKE, a citizen of the United States, residing at Chicago, in the county of Cook and State of Illinois, have invented a new and useful Improvement in Roller-Boxes for Wagon Axles and Hubs, of which the following is a specification.

My invention relates to roller-boxes for wagon axles and hubs, in which a cage containing a series of cylindrical rollers is contained within the core-box of the wagon-hub, and which cage revolves about the axle, my object being to provide an axle and hub that shall require the least possible amount of lubrication and at the same time give the least friction. I attain this object by means of the mechanism shown in the accompanying drawings, in which—

Figure 1:
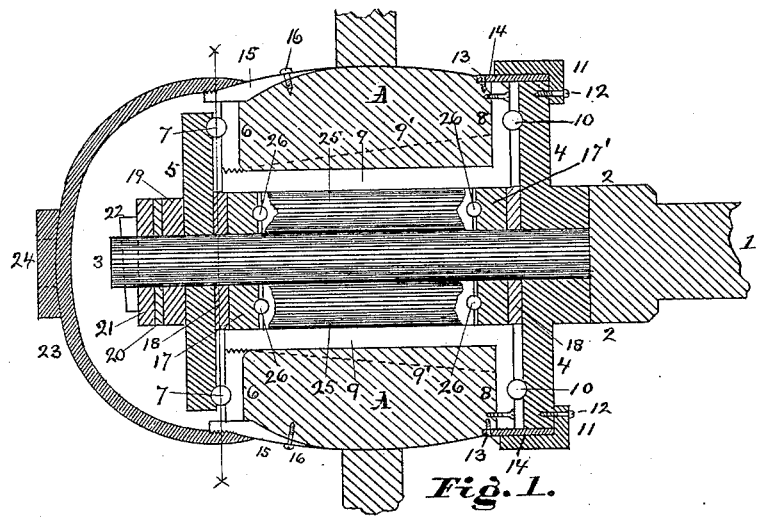
Figure 2:
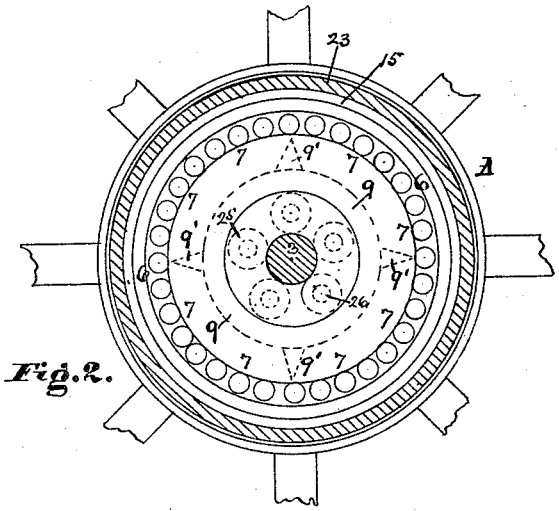

Figure 1 is a sectional view in the median line. Fig. 2 is a cross-section of the hub and axle in the line $x\ x$.

Similar letters and figures refer to similar parts throughout the several views.

I make a wagon-axle 1, on the ends of which I make a collar 2, and beyond the collar 2 I make a spindle 3, turned down to carry the cage and hub of the wheel. At the outer end of the spindle 3 I make a mortise in the median line, and in this mortise I make a close-fitting wedge 22. To the axle 1 and collar 2 I fit a plate 4 of circular form, through which the spindle 3 passes. This plate 4, has, at a convenient point on the face nearest the hub, a cylindrical groove, in which revolves a series of metallic balls 10. On the circumference of this plate 4 is secured a metallic cap 11, by screws. I then make a hub A that will fit over the spindle 3 and come up against the face of the plate 4. The center of the hub A, I core out, and in this core I fit a cage, consisting of a collar 17 and 17', grooved on the inner side with a series of cylindrical pits carrying metallic balls 26, which support rollers 25 which bear on the spindle 3 and the inside of the core. The collars 17 17' are secured together by rods to form the said cage.

About the cage containing the rollers 25 and collars 17 17' I make a metallic cylinder or core 9, and make a flange 8 on one end of the said core. This flange 8 is turned up smooth on the outer surface and grooved with a cylindrical groove opposite the position and similar to the groove in the face of the plate 4, and this groove carries the metallic balls 10. The flange 8 is secured to the hub by the screws in the outer face. The body of the core 9 is provided with wedge-shaped ribs 9', which enter the wood of the hub A and prevent the core 9 from revolving. On the end of the core 9 farthest from the flange 8 I cut a screw-thread, and to this screw-thread I secure a flange-plate 6. The flange-plate 6 is turned down smooth on the outer surface and grooved to carry the metallic balls 7, in a similar fashion to the flange 8. Between the flange-plate 6 and the flange 8 is the body of the hub A, and at one end of the hub A, over the flange 8, is secured a leather collar 14, held in place by the screws 13 and fitting under the metallic collar 11. On the outer end of the hub and over the flange 6 is a metallic collar 15, secured by the screws 16 and provided on the upper surface with a screw-thread.

On the spindle 3 and outside of the flange 6 is made a metallic collar 5, turned smooth on the inner surface and grooved with a groove to carry the metallic balls 7. Outside of the collar 5 I make a metallic washer 19, and then a leather or other elastic washer 20, and outside of this a second metallic washer 21. All these washers are held in place by the wedge 22. Over all the washers, wedge, and collar 5 and balls 7 I spring a spherical cap 23, secured by the nut 24 on the screw-thread on the end of the collar 15.

Between the end of the collars 17 and 17' and the plates 4 and plate 5 I pour a suitable lubricating compound 18 18.

Having thus described the parts of my invention, I proceed to explain the manner of using the same. I put the parts together in such a manner that the series of balls 10 shall roll in the groove of the plate 4, and the cage containing the rollers 25 shall rest in the end of the hub, the said rollers 25 rolling on the spindle 3 and the inside of the core of 9, and the balls 7 shall roll in the groove of the plate 6 and plate or collar 5. I then fill the space between the plates 4 and the collar 5 and the unoccupied space of the core in the center of the hub with a suitable fusible lubricant. I then adjust the washers 19, 20, and 21 and drive in the key or wedge 22 to bring up the whole to an equal bearing, and I then screw on the spherical cap 23 to the collar 15.

I am aware that wagon wheels and hubs with a central metallic core have been used, and it is not my intention to lay claim to a wagon wheel and hub in the broad sense; but What I do claim, and desire to secure by Letters Patent, is—

1. In an anti-friction journal for vehicles, the combination of an axle having a spindle of uniform diameter with a mortised end and key, and a series of metallic and elastic washers fitting over the said spindle, and a metallic collar or plate, also fitted over the said spindle and containing a cylindrical groove carrying a series of metallic balls, and a like plate at the other end of the spindle provided with a series of metallic balls rolling in a cylindrical groove, with a cage consisting of collars fastened together and containing a series of rollers pivoted to the said collars by a metallic ball, the said rollers revolving about the said spindle and the core of the hub, the unoccupied space within the said core being filled with a fusible lubricant, all substantially as and for the purpose set forth and described.

2. In an anti-friction journal for vehicles, the combination of an axle and spindle provided with a series of rollers and washers secured with a wedge or key, the said spindle being provided at one end with a circular grooved plate, in which roll a series of metallic balls, and having at the other end of the said spindle a similar circular plate with a cylindrical groove and a series of metallic balls, with a metallic case or box having a series of ridges and a turned flange with a cylindrical groove in the outer face carrying or accommodating the metallic balls of the opposite plate and provided at the other end with a flange screwed to the body of the case and bearing a groove, and a series of balls rolling in a groove in the opposite plate, all arranged and operating substantially as set forth.

3. In an anti-friction journal for vehicles, the combination of an axle and spindle provided with a plate having a cylindrical collar or cap of metal screwed to the said plate by screws, with a hub or body of a wheel having on the inner edge of the said hub a leather collar or band secured to the hub, and which leather collar projects under and revolves within the said metallic cap on the plate, all substantially as and for the purpose set forth and described.

ERNEST WM. COOKE.

In presence of—
T. E. SHEEHE,
T. McALLISTER.